United States Patent Office 3,336,111
Patented Aug. 15, 1967

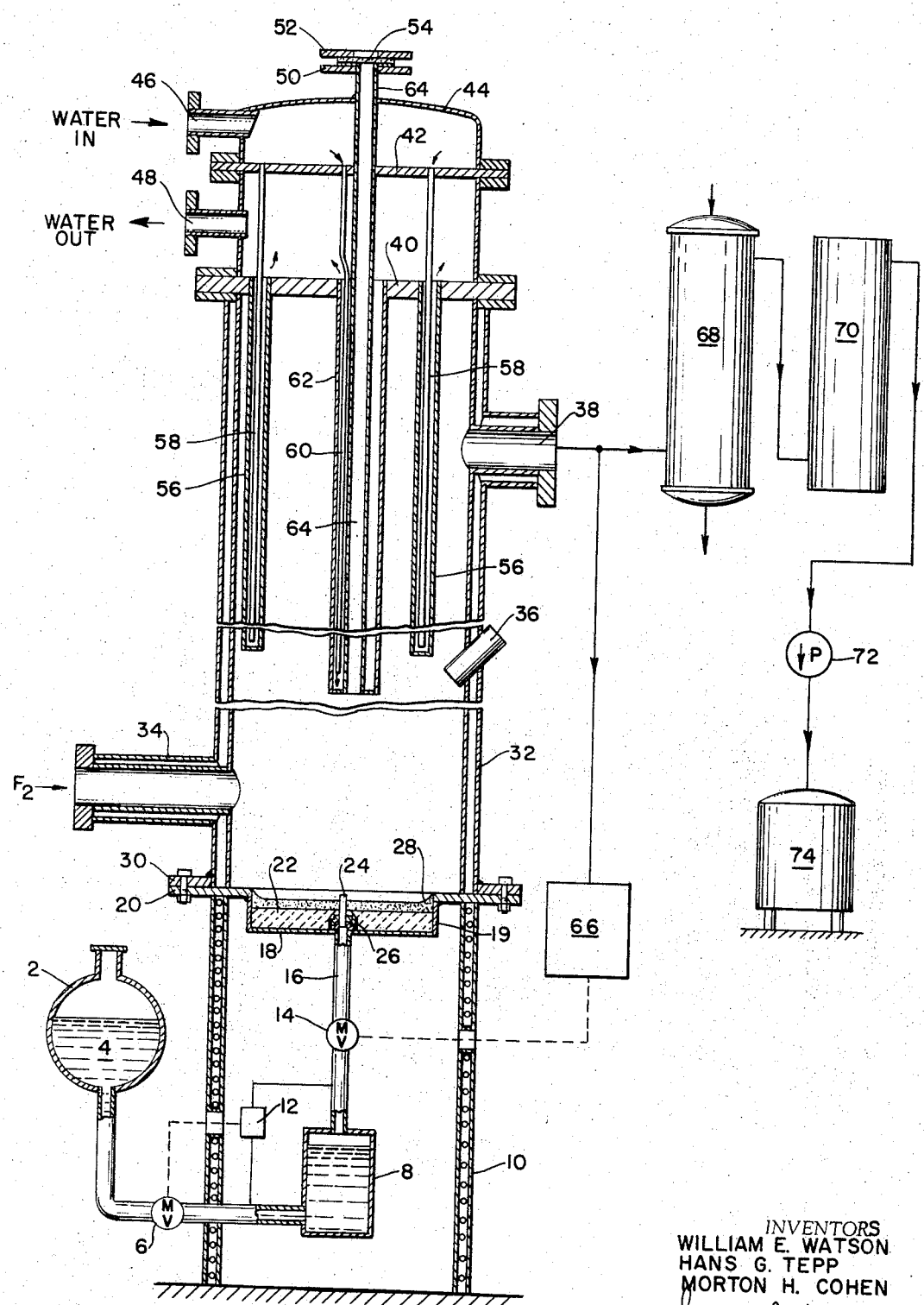

3,336,111
APPARATUS AND METHOD FOR THE MANUFACTURE OF FLUORIDES
William E. Watson, Mount Tabor, and Hans G. Tepp, Morris Plains, N.J., and Morton H. Cohen, Paducah, Ky., assignors to Allied Chemical Corporation, New York, N.Y., a corporation of New York
Filed May 19, 1964, Ser. No. 368,644
7 Claims. (Cl. 23—205)

This invention relates to the manufacture of fluorides, more particularly to the manufacture of inorganic fluorides from their constituent elements in gas phase reaction.

The present invention is applicable to the manufacture of a large number of inorganic fluorides with good yields in the desired products. The manufacture of inorganic fluorides by gas phase reactions is known; for instance, sulfur hexafluoride is made in the prior art by contacting the vapors emanating from a molten pool of sulfur with fluorine gas whereby $SF_6$ is formed in the resulting spontaneous combustion of the sulfur in the fluorine atmosphere. A considerable drawback of the prior art processes of this type is that yields are below desired values due to the production of ample amounts of side products such as $SF_4$, $S_2F_{10}$ and other lower fluorides with sulfur. Moreover, the ability of the prior art methods to combine the elements in this manner was always limited by unknown parameters, often passing unreacted fluorine at some reactant input rates. Production rates and flow velocities could not be increased with any predictable outcome, therefore, scale-up of equipment as well as production rates was very difficult, or impossible.

The inorganic fluorides which can be produced in accordance with the invention are the fluorides with such co-components the vapors of which are combustible in fluorine. In carrying out the process, controlled amounts of the vapors of fluorine as one reactant are contacted with controlled amounts of the vapors of the co-reactant in a reactor having the vicinity of the inlet for the co-reactant vapors formed from an alkali or earth alkali fluoride. The process of the present invention is applicable to the production of all inorganic fluorides the co-components of which are combustible in fluorine, in all valence states of the principal co-component. In one embodiment of the invention, usually in such cases when considerations such as high boiling point of the elemental form of the co-reactant which is to be contacted by fluorine, as the other reactant; and when a fluoride containing less fluorine than the product desired, can be obtained easily by methods other than that of the invention, such lower fluorine-containing compounds can be used as co-reactants with fluorine.

Typical of the co-reactants, the fluorides of which can be formed by the present process, are elemental S, I, Br, Cl, Hg, P, Na, K, Sb, etc., or their fluorides containing less fluorine than contained in the desired end product.

Further features of the invention are to be described in greater detail in the following specification wherein reference is being had to the accompanying sole figure constituting the drawing of the application, and illustrating a preferred embodiment of equipment for carrying out the present invention.

As shown in the drawing, in a storage tank 2 molten sulfur 4 is stored and fed through an evaporator supply valve 6 into an evaporator 8. The evaporator 8 and its vicinity are enclosed within an electrical shroud heater 10 which maintains the area enclosed by it at, or above the boiling point of sulfur (444.6° C.) to form sulfur vapors and to prevent the condensation of the sulfur vapors thus formed. The supply valve 6 is provided with a servomotor (not shown), which, in turn, is actuated by a level control 12. The sulfur vapors leave the evaporator 8 via a motorized feed valve 14 and a feed tube 16 to a reactor shown in greater detail, and being disposed above the just described sulfur evaporating assembly.

The bottom part of the reactor is contained within a stainless steel plate 18 formed integral with upstanding sidewall 19 terminating at its top in a flange 20, said plate 18, sidewall 19 and flange 20 forming a supporting shell. Disposed on the bottom plate 18 is a sintered alumina refractory block 22 having a hole through its center. A short sapphire tube 24 is disposed within the hole of the refractory block 22. The sapphire tube is connected to the terminal opening of the feed pipe 16 in the bottom plate 18 by a coupling union 26. The refractory block 22 is covered with a layer of powdered fluorspar 28, the top surface of the powder layer being slightly below the upper end of the sapphire tube 24. As shown in the drawing, the just-described bottom assembly of the reactor is also largely enclosed within the shroud heater 10 to prevent condensation of the sulfur vapor prior to the combustion thereof.

The bottom assembly of the reactor is joined by its flange 20 to a bottom-mounting flange 30 of the reactor. The walls 32 of the reactor are water jacketed, and at least the inner walls are made of an Ni-Cu alloy, such as is known, for instance, under the trade name Monel. At the bottom part of the reactor an inlet 34 is provided for the fluorine vapors, and a viewing window 36 is provided at an intermediate height of the reactor permitting a direct view of the fluorine inlet and the sulfur inlet from the exterior. Near the top of the water jacket 32 a product outlet 38 is provided.

On its top, the reactor chamber terminates in a water jacket mounting plate 40. Disposed a distance above the plate 40 is a water inlet mounting plate 42 topped by a dome 44. A water inlet 46 is provided in the dome 44, and a water outlet 48 is disposed between the mounting plates 40 and 42.

An assembly disposed on top and in the center of the dome 44, consists of a pair of flanges 50 and 52 having disposed therebetween a gasket 54 made of polytrifluorochloroethylene. The gasket is made of a transparent, colorless polymer to allow its also being used as a viewing window.

A plurality of cooling fingers range vertically into the interior of the reactor. The fingers consist of cooling jackets 56 mounted from, and opening through the mounting plate 40, and water feed pipes 58 disposed within the cooling jackets 56, and being mounted from, and opening through the mounting plate 42. A water feed pipe 60 mounted from an opening through the mounting plate 42 is disposed between an outer sighting tube water jacket 62 and a sighting tube 64 disposed concentrically within the water jacket 62. The water jacket 62 is mounted from, and opens through the mounting plate 40. The sighting tube 64 has a flared upper end mounted between the double flange 50, 52.

A small fraction of the gaseous end product emitted through the outlet 38, is diverted to a Redox potential analyzer 66 (Foxboro EMF Dyanalog Redox Analyzer) which controls the adjustment of the motorized sulfur feed valve 14 on the basis of the composition of the output gas. The main stream of the end product passes through a scrubber 68 which contains a 10–20% by weight aqueous solution of KOH. The purified end product is dried in a dryer 70, compressed by a compressor 72 for liquefaction, and collected, under pressure, in a storage tank 74.

The sulfur input rate is controlled by the analysis of the end product in the Redox potential analyzer 66 and the motorized valve 14 controlled thereby. This way it is assured that at all times the correct stoichiometric proportions of sulfur based on a constant stream of $F_2$, are fed through the sapphire tube 24. Sulfur and fluorine vapors are hypergolic, i.e. spontaneous combustion occurs upon contact. The sulfur burns in the fluorine and, depending on the respective stoichiometric proportions, sulfur fluorides are formed.

In the $SF_6$-forming embodiment of the invention, the flame temperature is 1650° C. or over, consequently, the vicinity of the reactor surrounding the flame, is exposed to the high temperature flame. The water cooled portion 32 of the reactor exposed to the interior atmosphere, is of a material which is resistant to fluorine vapors as well as to the vapors of various sulfur fluorides, but need not be resistant to sulfur vapors since all of these are consumed in the combustion reaction. A convenient material for this purpose is, for instance, Monel. Due to the water cooling, no particular corrosion problems arise in connection with the sidewalls.

A considerable problem, solved by this invention, was that of providing a material and mounting structure for the part of the reactor which includes the vicinity of the sulfur vapor inlet. The problem presented by the present process over the prior art processes is that the sulfur, or other co-reactant, is fed into the reactor in the vapor form, therefore, the vicinity of the sulfur inlet cannot be cooled below the boiling point of sulfur. On the other hand, the interior portion of the vicinity of the sulfur inlet, which is exposed to the interior of the reactor, has to be resistant not only to fluorine vapors, as the remaining internally exposed portions of the reactor, but also to sulfur vapors. Furthermore, the temperature within the reactor, since the flame is in the immediate vicinity of the inlet of the combustible vapors, i.e. sulfur vapors, is in the vicinity 1650° C. It was found that the fluorides of alkali and earth alkali metals can satisfactorily be used for this purpose. This category includes the fluorides of Mg, Ba, Ca, Cd, Li, K, Na, and Sr. In practice, the temperature of the top portion of the fluoride layer 28 is above melting point, therefore, the part of the layer exposed to the interior of the reactor is molten during the process. It is for that reason that the upper end of the sapphire tube 24 is slightly above the level of the exposed surface of the fluoride layer 28 to prevent the molten fluoride from running down the feed pipe 16.

The fluorides of alkali and earth alkali metals do not sublime, and boil above the temperatures to which they are subjected during the combustion process, and are chemically substantially inert to the atmosphere of any of the components or end products within the reactor. For a particular reaction, one or a mixture of those fluorides of alkali or alkali earth metals should be used which have a boiling point above and preferably a low or insignificant vapor pressure at the temperature to which the vicinity of the combustion is exposed. It does not have to withstand the actual flame temperature, since the temperature of the flame is higher than the temperature to which the refractory will be exposed. When temperatures at which the material has a substantial vapor pressure are used, the cooling means may be controlled to return the material as liquid to the reactor floor.

The cooling water entering through the inlet 46 into the water feed pipes 58 and 60, and which then passes through the water jackets 56 and 62, and leaves the apparatus at 48, serves to reduce the sensible heat of the gases emanating from the outlet 38, for the ease of further handling. The Redox analyzer 66 serves both in place of a flow meter in the sulfur feed line for initially adjusting the proper amount for the reaction, and also as a control device to maintain the required reactant proportions during the reaction. After the reaction has been started, and the sulfur vapor flow has been adjusted to the required stoichiometric ratio, the ratio can be maintained without further adjustment. It is preferred, however, in practice, to monitor the reaction intermittently or continuously by analyzer 66.

In the production of $SF_6$, the KOH solution in the scrubber 68 serves to remove possible unwanted by-products, etc. such as unreacted fluorine, and $SF_4$. If any $S_2F_{10}$ is present, this can be removed, in a known manner, by disproportionation into $SF_4$ and $SF_6$, for instance, in accordance with the process described in an article by W. C. Schumb, in Ind. Eng. Chem., vol. 39, pp. 421–423, (March 1947); prior to the end product entering the scrubber 68.

The purified $SF_6$ end product emanating from the scrubber 68 is subsequently introduced into the dryer 70, which contains $H_2SO_4$ as the drying medium.

If the production of other fluorides is desired, the process and equipment disclosed hereinabove with reference to the production of $SF_6$ needs to be modified only in the stages following the reactor. For instance, if $SF_4$ is to be produced, the scrubber 68 and dryer 70 cannot be used, instead, the product issuing from the reactor is compressed for liquefaction and fractionated to separate the desired $SF_4$, while obtaining other fluorides as by-products.

In order to obtain maximum yield of the particular desired end product, the reactants are fed into the reactor in stoichiometric proportions. It was found, however, that a ±5% deviation from the stoichiometric proportions will still result in practical and economical yields in the desired end product.

In the following examples are given of the process of the invention illustrating the best method contemplated for carrying it out. It is to be understood, however, that the invention is not to be limited to all details of the examples. Temperatures are expressed in ° C., parts and percentages are by weight.

*Examples 1–8*

In the following table the details and the results of Examples 1–8 are shown. As apparent from the examples, deviations of up to ±5% by weight, about the theoretical proportions of the reactants, for a given end product, can be economically tolerated. In Example 4 the $IF_7$ by-product can be recovered as $IF_5$ by contact with additional $I_2$, or recovered from $IF_5$ by distillation. In Example 5 the unreacted iodine can be converted to $IF_5$ by additional contact with fluorine, or can be separated by distillation. In Example 6 the unreacted fluorine can be recovered as $IF_5$ by contacting it with additional $I_2$, or it can be vented after the $IF_7$ is condensed. In Example 7, the $IF_5$ by-product can be separated by distillation, or the $IF_5$ can be recycled with more $F_2$ for conversion to the desired $IF_7$.

| Example No. | Input (parts) | | Output (parts) | |
|---|---|---|---|---|
| | Co-reactant | $F_2$ | Principal | By-product or Unreacted |
| 1 | 26.7 S | 100 | 121.7 $SF_6$ (96.1%) | 5 $F_2$ (3.9%) |
| 2 | 29.5 S | 100 | 114.1 $SF_6$ (88.1%) | 15.4 $SF_4$ (11.9%) |
| 3 | 35.6 S | 100 | 71.6 $SF_4$ (50.4%) | 50.8 $SF_6$; 13.2 $S_2F_{10}$ (39.7%) (9.9%) |
| 4 | 131.8 $I_2$ | 100 | 222 $IF_5$ (95.8%) | 9.8 $IF_7$ (4.2%) |
| 5 | 140.2 $I_2$ | 100 | 23.5 $IF_5$ (97.2%) | 6.7 I (2.8%) |
| 6 | 90.6 $I_2$ | 100 | 185.8 $IF_7$ (97.5%) | 4.8 $F_2$ (2.5%) |
| 7 | 99.9 $I_2$ | 100 | 171.6 $IF_7$ (85.8%) | 28.3 $IF_5$ (14.2%) |
| 8 | 470 $SbF_3$ | 100 | 570 $SbF_5$ (100%) | |

We claim:
1. In a process for preparing an inorganic fluoride by contacting in a reaction zone a co-reactant vapor selected from the group consisting of Br, I, Cl, Hg, P, Na, K, Sb, S and fluorides thereof fluorinated to a state lower than that which is to be produced, with a closely controlled amount of gaseous elemental fluorine, the improvement which comprises introducing a closely controlled amount of said co-reactant vapor into said reaction zone through inlet means comprising an inlet surrounded by at least one fluoride selected from the group consisting of Ba, Cd, Ca, Li, Mg, Na, and Sr fluoride, said selected fluoride having a boiling point above the temperature to which the vicinity of said inlet means is exposed during reaction, said inlet means allowing the close control of said amount of co-reactant vapor.

2. The process of claim 1 wherein said co-reactant is sulfur, and the fluoride surrounding said co-reactant inlet is calcium fluoride.

3. The process of claim 2 wherein the controlled amounts of sulfur and fluorine are within ±5% by weight of the theoretical proportions needed to form $SF_6$ and wherein said process further comprises cooling the combustion products, separating $SF_6$ from the cooled combustion products, and removing the separated $SF_6$.

4. In a reactor having a chamber for the production of fluorides by the gas phase reaction of fluorine vapors with vapors of co-reactants combustible in fluorine, the improvement comprising an inlet into the chamber for the vapors of the co-reactant, said inlet being surrounded by at least one fluoride selected from the group consisting of alkali metal fluorides, alkali earth metal fluorides and cadmium fluoride.

5. The improvement of claim 4, wherein said inlet is surrounded by at least one member of the group consisting of the fluorides of Ba, Cd, Ca, Li, Mg, Na, and Sr.

6. The improvement of claim 4, wherein said inlet comprises a supporting shell having a side open to the interior of the reactor, an opening in the bottom of said shell, and a feed pipe for the vapors of said co-reactant, said feed pipe being mounted for communication with the opening, said fluoride being disposed within said shell and substantially surrounding said feed pipe.

7. A reactor for the production of sulfur fluorides, comprising evaporating means for producing sulfur-containing vapors, a reactor vessel having at least an inlet each for at least sulfur-containing vapors and for fluorine vapors, said evaporating means being in fluid communication with the interior of said reactor vessel, a bed containing an alkali earth metal fluoride disposed about said inlet for the sulfur-containing vapors, and means for cooling selected portions of said reactor vessel.

References Cited
UNITED STATES PATENTS 2,840,457    6/1958    Burg et al. _____ 23—205

OTHER REFERENCES

Mellor: Comprehensive Treatise on Inorganic and Theoretical Chemistry, volume 10, page 630, 1930.

OSCAR R. VERTIZ, *Primary Examiner.*

J. J. BROWN, G. T. OZAKI, *Assistant Examiner.*